United States Patent
Hayday

(12)
(10) Patent No.: US 6,524,474 B2
(45) Date of Patent: Feb. 25, 2003

(54) SOLVENT PURIFYING SYSTEM

(75) Inventor: William A. Hayday, Woodbury, NY (US)

(73) Assignee: Rynex Holdings Ltd., Hamilton (BM)

( * ) Notice: Subject to any disclaimer, the term of this patent is extended or adjusted under 35 U.S.C. 154(b) by 0 days.

(21) Appl. No.: 09/929,749

(22) Filed: Aug. 14, 2001

(65) Prior Publication Data

US 2001/0054585 A1 Dec. 27, 2001

Related U.S. Application Data

(63) Continuation of application No. PCT/US00/05289, filed on Feb. 26, 2000.
(60) Provisional application No. 60/121,793, filed on Feb. 26, 1999.

(51) Int. Cl.[7] .................. B01D 17/025; B08B 3/10; D06F 43/08
(52) U.S. Cl. .................. 210/167; 210/172; 210/187; 210/519; 210/521; 8/141; 8/142; 134/107; 134/109
(58) Field of Search .................. 210/167, 171, 210/172, 187, 519, 521, 532.1, 538, 540; 8/141, 142; 134/107, 109; 165/184

(56) References Cited

U.S. PATENT DOCUMENTS

| | | |
|---|---|---|
| 437,421 A | 9/1890 | Dorn et al. |
| 454,665 A | 6/1891 | Pendergast et al. |
| 3,674,650 A | 7/1972 | Fine ............................ 202/176 |
| 4,191,651 A | 3/1980 | Cheysson et al. ............ 210/265 |
| 4,283,279 A | 8/1981 | Smith .......................... 210/123 |
| 5,069,755 A | 12/1991 | Durr et al. ................... 202/169 |
| 5,236,580 A | 8/1993 | Kelleher ....................... 210/97 |
| 5,888,250 A | 3/1999 | Hayday et al. ................ 8/142 |
| 6,315,131 B1 * | 12/2001 | Terrier et al. ................ 210/519 |

FOREIGN PATENT DOCUMENTS

| | | |
|---|---|---|
| EP | 479146 | 4/1992 |
| WO | 98/45523 | 10/1998 |

* cited by examiner

Primary Examiner—Christopher Upton
(74) Attorney, Agent, or Firm—Synnestvedt & Lechner LLP

(57) ABSTRACT

A solvent separator apparatus having a vertical accumulator tank with a top end and a bottom end, the accumulator tank being serially connected to a vertical reservoir tank having a top end and a bottom end; a down tube vertically positioned in the accumulator tank having a top end nearest the top end of the accumulator tank and a bottom end nearest the bottom end of the accumulator tank, with an inlet at the top end of the down tube and an outlet at the bottom end of the down tube; an inlet conduit connected to the inlet of the down tube, the inlet conduit entering the bottom end of the accumulator tank and defining an upward flow path within the accumulator tank to the inlet at the top end of the down tube; a heat exchanger in communication with the down tube for withdrawing heat therefrom; and a transfer conduit defining a downward flow path from the top end of the accumulator tank to the bottom end of the reservoir tank. Systems in which the apparatus is combined with a dry cleaning machine are also disclosed.

37 Claims, 3 Drawing Sheets

SOLVENT PURIFYING SYSTEM

CROSS-REFERENCE TO RELATED APPLICATION

The present application is a Continuation of International Application No. PCT/US00/05289 filed Feb. 26, 2000, which, in turn, claims priority benefit of U.S. Provisional Application Ser. No. 60/121,793, filed Feb. 26, 1999. The disclosures of both applications are incorporated herein by reference.

BACKGROUND OF THE INVENTION

The present invention relates to an apparatus for separating solvents having a limited degree of miscibility. In particular, the present invention relates to an apparatus for the removal of water from glycol ether dry cleaning solvents. The present invention further relates to a system in which the apparatus of the present invention is used in combination with a dry-cleaning machine, which cleans fabrics and other materials with a glycol ether dry cleaning solvent, to remove water that accumulates in the solvent during the dry cleaning process.

In a dry-cleaning machine, the clothing or other fabric to be cleaned is tumbled or agitated in the presence of a liquid solvent that removes dirt, oil, grease and other soiling substances. Garments entering a dry cleaning plant contain significant quantities of water in the form of moisture. The water is removed from the fabric by the solvent along with the soiling substances.

Traditionally, dry cleaning solvents, such as perchloroethylene, are water-immiscible and have a density greater than that of water. Thus, when the perchloroethylene is returned to the solvent tank of a dry cleaning machine, the water removed from the fabric floats to the surface, with any soil dissolved therein, where it is easily removed. The other soiling substances are removed either by filtration or, alternately, by distillation of the dry cleaning solvent.

Because perchloroethylene poses a hazard to health and the environment, substitute solvents have been developed. EP 479,146 discloses the use of propylene glycol monomethyl ether as a safe alternative to perchloroethylene. The use of propylene glycol tertiary butyl ether (PTB) and propylene glycol n-butyl ether (PNB) as dry cleaning solvents is disclosed by WO 98/45523. Other glycol ethers have been identified as potential replacements for perchloroethylene as a dry cleaning solvent. The glycol ethers, especially PTB and PNB, possess the requisite detergency for dry cleaning without damaging garments and other fabrics. The glycol ethers also dry at temperatures suitable for use with fine fabrics. From the standpoint of health and safety, glycol ethers are non-carcinogenic, nontoxic and biodegradable.

Glycol ethers also differ from perchloroethylene by being marginally miscible with water, particularly at the temperatures employed with dry cleaning. Consequently, the glycol ether is diluted by clothing moisture during the dry cleaning process, reducing the cleaning ability of the solvent. This can be restored by replenishment of the glycol ether through distillation.

WO 98/45523 discloses that water can be removed from PTB and PNB by distillation. However, the energy required for distillation of glycol ethers is also costly. Ideally, distillation should be reserved for reclaiming heavily soiled solvent.

U.S. Pat. Nos. 3,674,650; 5,069,755; and 5,236,580 disclose distillation systems for use with dry cleaning machines to purify perchloroethylene. U.S. Pat. No. 4,191,651 discloses an apparatus for separating two immiscible liquids. However, such a device would not efficiently separate liquids having even a limited degree of miscibility.

There remains a need for an energy efficient means by which water can be separated and removed from modem glycol ether dry cleaning solvents.

SUMMARY OF THE INVENTION

This need is met by the present invention. The present invention provides an apparatus for separating two miscible liquids with a high degree of energy efficiency. The apparatus cools the mixture to a temperature below which the two liquids are miscible and then employs gravity separation to partition the two liquids. The apparatus may be used to separate essentially any mixture of two miscible solvents.

Therefore, according to one aspect of the present invention, an apparatus is provided, including:

a vertical accumulator tank having a top end and an bottom end, with the accumulator tank being serially connected to a vertical reservoir tank having a top end and a bottom end;

a down tube vertically positioned in the accumulator tank and having a top end nearest the top end of the accumulator tank and a bottom end nearest the bottom end of the accumulator tank, and with an inlet at the top end of the down tube and an outlet at the bottom end of the down tube;

an inlet conduit connected to the inlet of the down tube, the inlet conduit entering the bottom end of the accumulator tank and defining an upward flow path within the accumulator tank to the inlet at the top end of the down tube;

a heat exchanger in communication with the down tube for withdrawing heat therefrom; and a transfer conduit defining a downward flow path from the top end of the accumulator tank to the bottom end of the reservoir tank.

The apparatus is most effective for the separation of liquids that are miscible above and immiscible below a temperatures of about 60° C. The apparatus can be used to separate liquid mixtures that remain miscible at temperatures as low as room temperature, so that the apparatus may be used to separate heated liquid mixtures that are immiscible at room temperature (room temperature defined as being about 22° C.).

The apparatus is particularly useful in dewatering glycol ethers used as the cleaning solvents in modern dry cleaning equipment. Therefore, according to another aspect of the present invention, a system is provided in which a dry cleaning machine adapted to cleaning clothing or other fabrics with glycol ethers, and having a cleaning section in communication with a glycol ether storage tank, is combined with the apparatus of the present invention. Glycol ethers from the storage tank are pumped to the apparatus where they are dewatered. After dewatering, the glycol ethers are then pumped back to the solvent storage tank.

Some water will always be bound to the glycol ether as an azeotrope. However, the removal of excess water from the glycol ether is critical in order to control the shrinkage of woolens and other fabrics.

Typical dry cleaning systems have three or more solvent tanks, one of which is used to store reclaimed, distilled solvent, with the others being designated work tanks, which supply dry cleaning solvent to the cleaning sections of the dry cleaning machine, which then returns the solvent to the work tanks. The present invention therefore also includes an apparatus in which the accumulator tank is compartmentalized into individual cells, each dedicated to a separate solvent tank of a dry cleaning machine. Therefore, according to another aspect of the present invention, an apparatus is provided in which the accumulator tank is divided vertically into a plurality of isolated compartments, each compartment having a down tube vertically positioned therein. The apparatus further includes a plurality of inlet conduits, each entering the bottom end of an individual compartment and defining an upward flow path within each compartment and connected to the top inlet of each down tube. Each down tube is provided with a heat exchanger, and each compartment has a separate transfer conduit defining a downward flow path to the bottom end of the reservoir tank. The purpose of rising to the top and then back to the bottom is to limit the amount of loss from the cell should there be a failure of the input tube.

A single reservoir tank may be used to collect dewatered solvent from the plurality of accumulator tank compartments, which is then supplied to the plurality of dry cleaning machine solvent tanks from the single reservoir tank. Alternatively, the reservoir tank may also be divided vertically into a plurality of isolated compartments, each compartment corresponding to a compartment of the accumulator tank. Each of a plurality of transfer conduits would define a downward flow path from the top end of an accumulator tank compartment to the bottom end of the reservoir tank corresponding thereto. Each reservoir tank compartment is then dedicated to a solvent tank of the dry cleaning machine and each of a plurality of outlet conduits defines a flow path exiting the bottom end of its reservoir tank compartment and returning to the dry cleaning machine solvent tank corresponding thereto.

The apparatus of the present invention may also be used in other end use applications for glycol ethers in which dewatering is required. Such applications include, but are not limited to, dyeing processes in which glycol ethers are used as the solvents, processes for scouring raw wool and milling the scoured raw wool, and processes in which glycol ethers are used to clean or degrease metal parts or electronic components. Furthermore, the apparatus of the present invention may be applied to essentially any end use application in which it is desirable to obtain the separation of two miscible solvents.

The foregoing and other objects, features and advantages of the present invention are more readily apparent from the detailed description of the preferred embodiments set forth below, taken in conjunction with the accompanying drawings.

DETAILED DESCRIPTION OF THE PREFERRED EMBODIMENT

Figure 1:
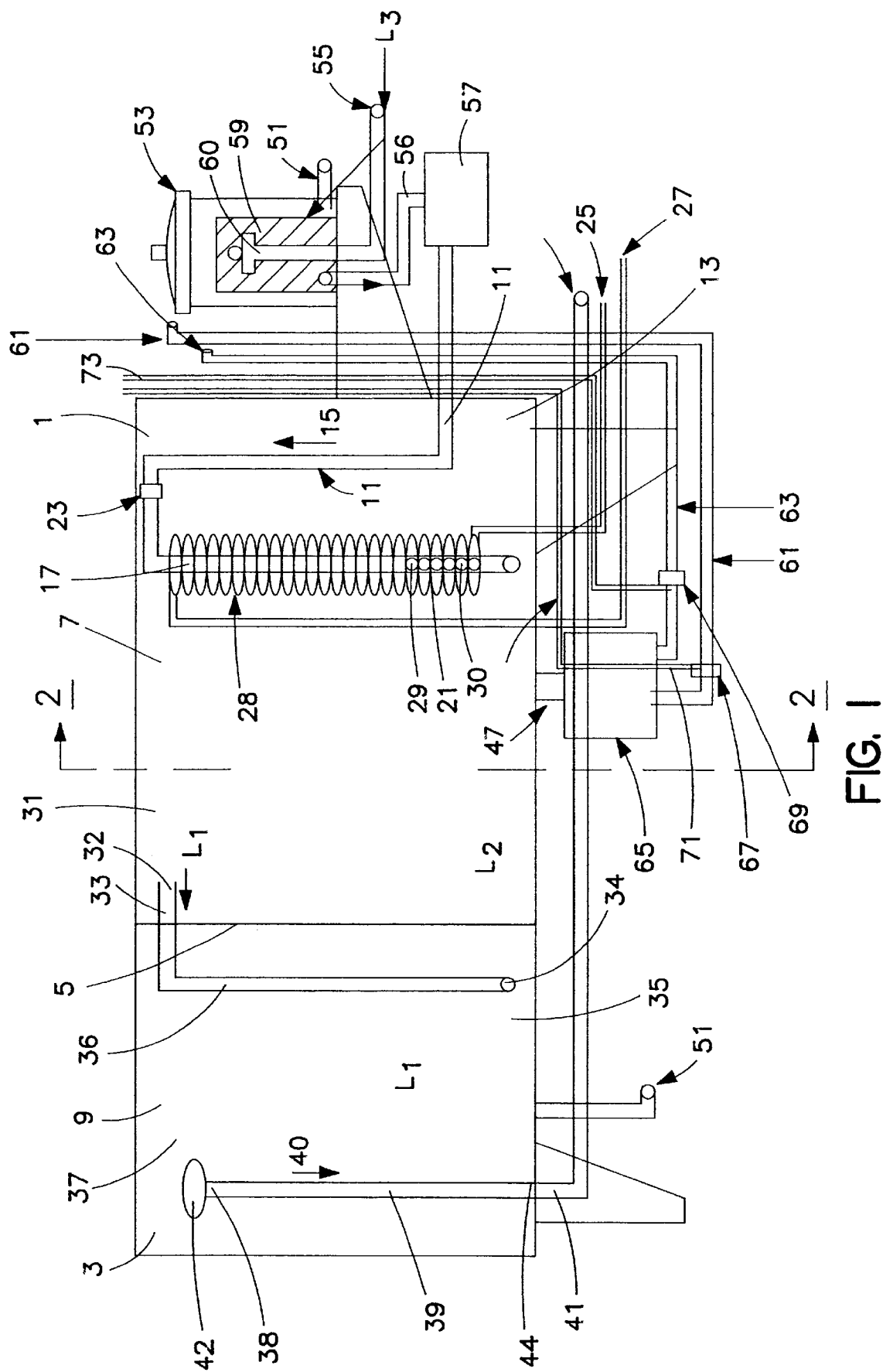
FIG. 1 is a side, cross-sectional view of an apparatus according to one embodiment of the present invention.

The apparatus 1 depicted on FIG. 1 consists of tank 3 divided along its entire length by wall 5 into accumulator tank 7 and reservoir tank 9. Inlet conduit 11 enters the bottom end 13 of accumulator tank 7 and defines an upward flow path 15 through the accumulator tank. The inlet conduit 11 is connected via a down tube 17 to exit ports 29 and 30 in the down tube 17. Anti-siphon valve 23 prevents the liquid mixture from being siphoned back into inlet conduit 11.

The coil 28 cools the outbound liquid from 29 and 30, which in the embodiment of FIG. 1 is a heat exchanger cooling coil through which a coolant flows, typically water from inlet 27 through the coil to outlet 25. However, when colder temperatures are required, a refrigerant may be used. Essentially any means for withdrawing heat from the down tube 17 may be employed.

In the depicted embodiment water is supplied to the coil 28 at inlet 27 and withdrawn at outlet 25. Cold fresh water may be continuously supplied to the heat exchanger, or, alternatively, the outlet water may be cooled by a refrigerator (not shown) and returned to the heat exchanger by way of inlet 27.

The portion 21 of the down tube 17 within the coil 28 has perforations 29 in the depicted embodiment. This permits the liquid to flow over the coils of the heat exchanger when exiting the down tube, which increases cooling efficiency. Transfer conduit 33 defines a downward flow path 36 from the top end 31 of accumulator tank 7 to the bottom end 35 of the reservoir tank 9. Outlet conduit 39 is positioned vertically in the reservoir tank and has a top end 38 with an inlet 42 positioned near the top end 37 of the reservoir tank. The outlet conduit defines a downward flow path 40 exiting the bottom 35 of the reservoir tank. In the depicted embodiment, outlet 41 at the end 44 of outlet conduit 39 is in communication with a solvent return line. Liquid at the bottom 35 of reservoir tank 9 is recirculated by line 51 to inlet conduit 11 via filter unit 53.

The apparatus of FIG. 1 may be modified depending upon the physical characteristics of the liquid mixture to be separated. The apparatus cylinder may be jacketed so that a coolant may be circulated through the jacket to pre-cool the cylinder contents. For example, a heat exchanger employing a cryogenic refrigerant may be used, or the apparatus cylinder may be pressurized to maintain volatile materials in the liquid state.

With reference to FIG. 1, the apparatus of the invention operates as follows:

A mixture $L_3$ of two miscible liquids $L_1$ and $L_2$ is supplied to the accumulator tank 7 via inlet conduit 1. The mixture is transferred to the accumulator tank by a pump 57 after being passed through the filter element 59 of filter 53 to remove particulate matter. Conduit 56 delivers the mixture from the filter 53 to the pump 57. The mixture is supplied to the filter 53 from a solvent tank (not shown) by conduit 55.

The mixture is delivered by the inlet conduit 11 through the bottom 13 of the accumulator tank upwardly through the tank to the top end of down tube 17. The mixture then flows to the outlet 29 and the bottom end 30 of the cooling column, passing through coil 28, which draws heat from the mixture, lowering the temperature of the mixture below the temperature range within which $L_1$ and $L_2$ are miscible. $L_1$ and $L_2$ separate, with the denser liquid, for purposes of illustration, $L_2$, remaining at the bottom end 13 of the accumulator tank 7 upon discharge from the outlet 29 of the cooling column, and the lower density liquid, $L_1$, floating to the top end 31 of the accumulator tank.

The lower density liquid $L_1$ is then drawn into the inlet 32 of transfer conduit 33 at the top end of the accumulator tank. The transfer conduit delivers the lower density liquid through the reservoir tank 9, where it is discharged through outlet 34 at the bottom 35 of the tank 9. Any remaining quantities of the denser liquid $L_2$ sink to the bottom of the reservoir tank, so that the liquid at the top of the reservoir tank is the lower density liquid $L_1$ essentially free of the denser solvent $L_2$.

The lower density liquid $L_1$ is then drawn from the top end 37 of the reservoir tank into the opening 38 of outlet conduit 39. The lower density liquid $L_1$ is delivered by the outlet conduit through the bottom 35 of the reservoir tank after which the essentially pure liquid is either collected or recirculated (not shown). The denser liquid $L_2$ is discharged from the accumulator tank through outlet 47, and from the reservoir tank through outlet 51. The denser liquid will be essentially free of the lower density liquid $L_1$.

Figure 2:
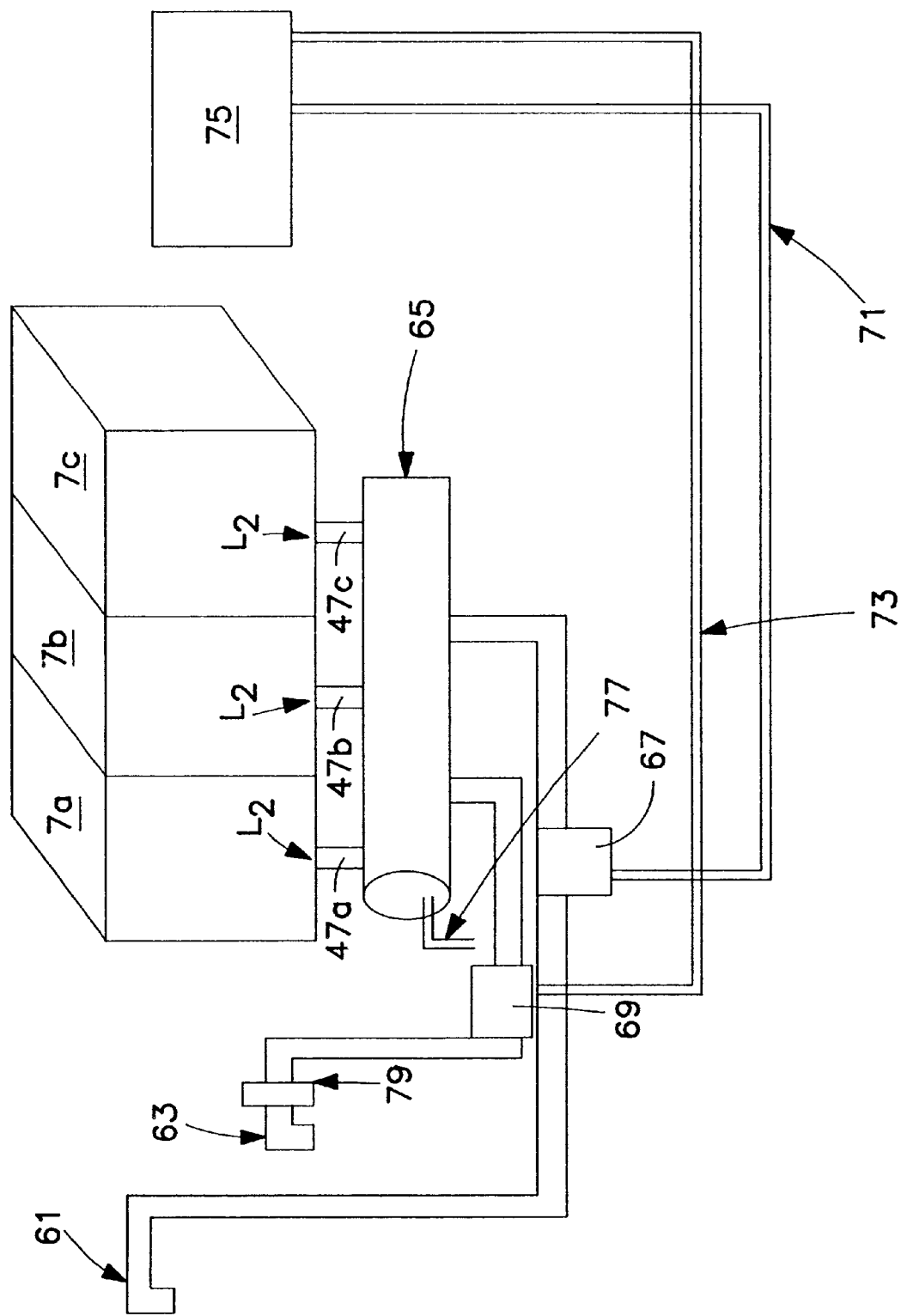
FIG. 2 is a front perspective view of the apparatus of FIG. 1.

Outlet 51 returns the denser solvent $L_2$ to inlet conduit 11 of accumulator tank 7 via filter unit 53. Referring to FIG. 2 (from which the filter unit has been omitted for purposes of clarity), outlets 47a, 47b and 47c deliver solvent $L_2$ from the respective bottoms of accumulator tanks 7a, 7b and 7c to manifold 65. The outlets 47a, 47b and 47c contain solenoid-controlled drain valves (not shown) to prevent balancing between the tanks when one or more are being drained. Solenoid valve 67 controls the delivery of solvent $L_2$ from the manifold 65 to a water separator (not shown) by conduit 61. Solenoid valve 67 is controlled by microprocessor 75 providing instructions by way of electrical conduit 71. Solenoid valve 69 controls the delivery of solvent $L_2$ to a solvent distillation apparatus (not shown) by conduit 63. Solenoid valve 69 is controlled by microprocessor 75 providing instructions by way of electrical conduit 73.

Drain valve 77 on the manifold 65 allows the total system (and accumulator tanks) to be drained. Check valve 79 prevents the backflow of the solvent to the manifold unit.

The purpose of the solenoid valve 67 and 69 is to permit small quantities of the denser solvent $L_2$ to be drawn from the bottom of the accumulator tank. The microprocessor opens each solenoid valve to permit a small amount of the denser liquid $L_2$ to pass to either the water separator or the distillation apparatus, depending upon the solenoid valve that is opened. The heights of conduits 61 and 63 are set lower than the total column height of the accumulator tank, so that the amount of liquid removed will be limited to the height of its corresponding conduit. Thus, the height of conduit 61 is selected so that essentially only the denser liquid drawn therethrough upon the opening of valve 67. The height of column 63 is selected so that only denser contaminate levels of the lower density liquid are therethrough upon the opening of valve 69.

Referring again to FIG. 1, reservoir tank 9 has a small drain fitting at the lowest point to drain any accumulation of the denser solvent $L_2$ through conduit 51, which connects the drain fitting to the filter unit 53, thus ensuring that the denser solvent $L_2$ is removed and the pump 57 is constantly primed. The height of the filter unit 53 is set above the column height of the reservoir tank 9 to prevent overflow. The center tube 60 of the filter unit 53 acts as a drain and allows the reservoir tank 9 to drain back to the solvent tank (not shown) in the event that the filter were to leak air at the top. The height of the tube 60 is selected to limit the amount of solvent that can return to the solvent tank.

Normally, a small amount of liquid is pulled from the bottom of the reservoir tank 9 to the filter housing 53 on the clean side of the filter 59 through the pump 57 and back into the separation cycle of the accumulator tank 7. This ensures that the denser solvent $L_2$ does not accumulate in the reservoir tank 7 and also ensures that the pump 57 re-primes after each cleaning of the filter 59. A restriction (not shown) is preferably introduced onto conduit 51 to limit the flow of liquid from the reservoir tank 9, so that essentially only the denser solvent is removed unless greater quantities of liquid are needed to keep the filter 59 flooded and the pump 57 primed.

The apparatus of the present invention may be used to separate a mixture of two liquids in which the recovery or recirculation of both liquids is desired. Alternatively, the apparatus may be used to remove a lower density liquid contaminant from a denser liquid or a denser liquid contaminant from a lower density liquid. Particulate and soluble contaminants may also be removed with the liquid contaminant phase.

A liquid mixture containing more than two liquids may be employed. The mixture will separate into a substantially more polar liquid or liquid mixture and a substantially less polar liquid or liquid mixture.

The apparatus of the present invention is particularly well suited for the dewatering of glycol ethers used in modern dry-cleaning machines. A system in which an apparatus according to another embodiment of the present invention is operated in combination with a dry-cleaning machine is shown in FIG. 3.

Figure 3:
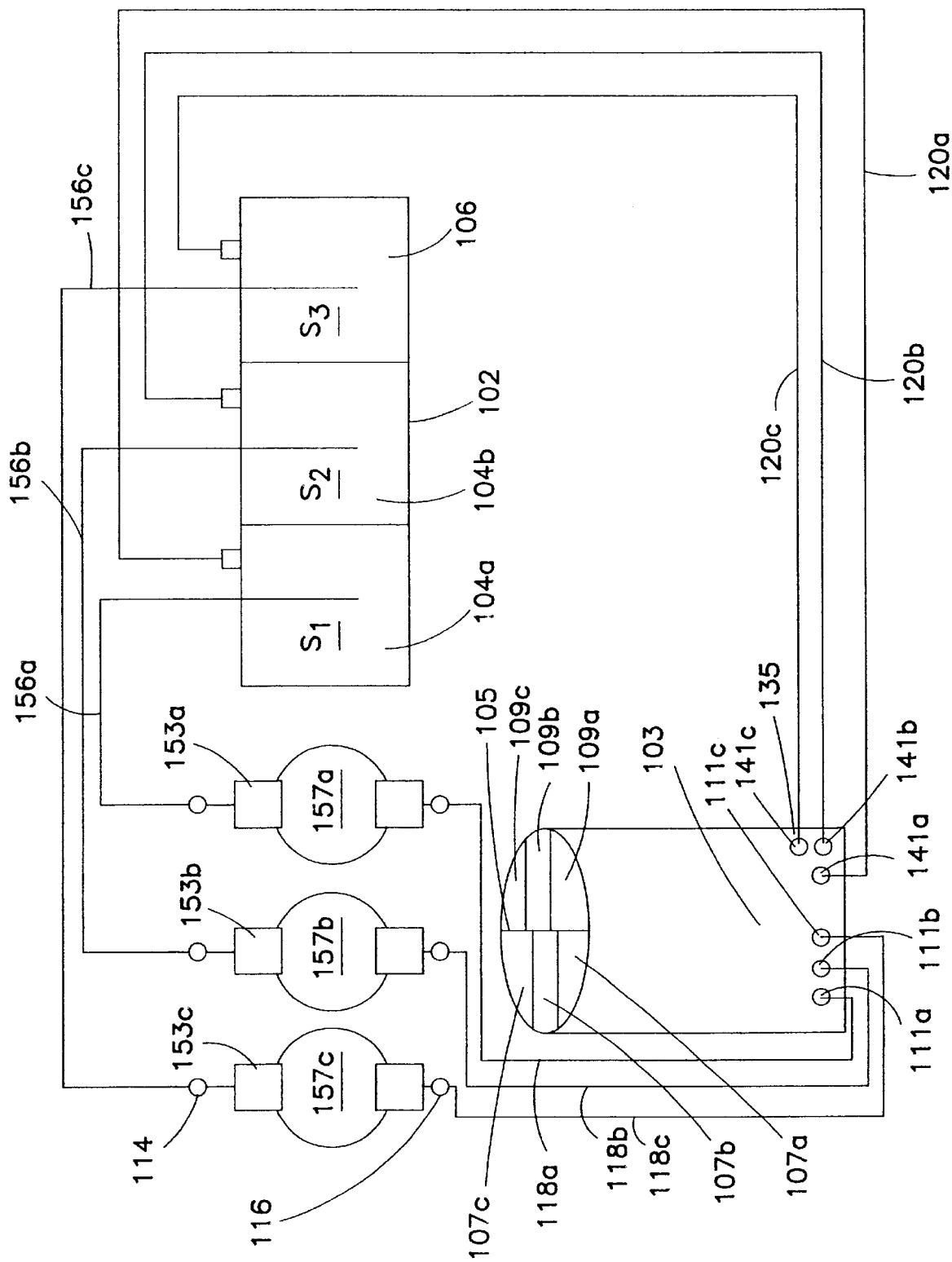
FIG. 3 is a schematic view of one embodiment of a system according to the present invention in which an apparatus according to another embodiment of the present invention is used in combination with a dry-cleaning machine.

The system depicted in FIG. 3 consists of a dry-cleaning machine, only the solvent tank 102 of which is shown. The solvent tank consists of work tanks 104a and 104b and clean tank 106. The glycol ether solvent S contained in each tank becomes contaminated with water, as well as with dirt particles, fatty acids, fats, oils and grease as it is circulated through the dry cleaning machine.

Pump 157a draws solvent $S_1$ from work tank 104a through solvent inlet line 156a and filter 153a. Pump 157b draws solvent $S_2$ from work tank 104b through solvent inlet line 156b and filter 153b, and so forth. The lines enter each pump through compression fittings, for example, fittings 114 and 116 of pump 157c. Pump 157a then pumps solvent $S_1$ through solvent line 118a to cylinder 103. Pump 157b pumps solvent $S_2$ through solvent line 118b to the cylinder, and so forth.

Cylinder 103 is an apparatus according to another embodiment of the present invention. In this embodiment, the accumulator tank 107 is separated into compartments 107a, 107b and 107c. Likewise, reservoir tank 109 is separated into compartments 109a, 109b and 109c. Each compartment 107a, 107b, 107c is configured like the accumulator tank of the apparatus depicted in FIG. 1. Each compartment 109a, 109b and 109c is configured like the reservoir tank 9 depicted in FIG. 1.

Each compartment has its own down tube from which heat is withdrawn by a heat exchanger (not shown). Solvent line 118a enters the bottom of compartment 107a and defines an upward flow path to the top of compartment 107a where it discharges into the top of a down tube; solvent line 118b enters the bottom of compartment 107b and defines an upward flow path to the top of compartment 107b where it discharges into the top of a down tube; and so forth.

A transfer conduit (not shown) defines a downward flow path from the top end of compartment 107a to the bottom end of reservoir tank compartment 109a. Likewise, another transfer conduit (not shown) defines a downward flow path from the top end of compartment 107b to the bottom end of reservoir tank compartment 109b; and so forth. Each reservoir tank compartment has an outlet conduit positioned vertically therein with the inlet end situated near the top end of its compartment. Each outlet conduit defines a downward flow path through its compartment and exiting the bottom thereof.

Openings in each outlet conduit at 141a, 141b, 141c connect to solvent return line 120a, 120b, 120c, respectively, to define return flow paths to tanks 104a, 104b and 106, respectively.

Openings in the bottom of each accumulator tank compartment and reservoir tank compartment of the type depicted in FIGS. 1 and 2 are employed to drain the bottom of each compartment.

Referring again to FIG. 3, the system of the present invention operates as follows:

Solvent $S_1$, $S_2$, $S_3$ is drawn from tanks 104a, 104b, 106 through inline filters 153a, 153b, 153c via respective pumps 157a, 157b, 157c and then into respective accumulator compartments 107a, 107b and 107c. The pumps force the solvent to rise in the upward flow paths defined by the inlet conduit in each accumulator tank compartment, after which the solvents then drain into the corresponding down tube of each compartment. Heat exchangers in each compartment withdraw heat from each down tube, reducing the temperature of the solvent in each compartment. The heat exchangers also cool the contents of each compartment, so that the liquid within each compartment functions as a highly effective heat sink, cooling and separating the solvent mixture in each inlet conduit and down tube.

Exiting the down tubes, the temperature reduction in the solvent causes moisture to precipitate, and, being heavier than solvent, it falls to the bottom of each accumulator compartment. When water precipitates and falls to bottom, any water soluble contaminants, particulate matter, fatty acids, oils, greases and residual perchloroethylene (from previous dry cleaning) sink to the bottom as well. The lighter solvent rises in each accumulator compartment and overflows to the transfer conduit for each accumulator compartment, each of which transfers solvent to the corresponding and adjacent reservoir compartment.

The reservoir tank and compartments thereof serve to isolate the dewatered solvent from moisture in the accumulator tank. The reservoir tank and reservoir compartments also serve to retain the dewatered solvent for recirculation to the dry cleaning machine solvent tanks. Therefore, the present invention also includes an embodiment in which the accumulator tank is compartmentalized but the reservoir tank is not. Instead, transfer conduits from each accumulator tank compartment discharge solvent to a single reservoir tank.

Any moisture remaining in the solvent not bound thereto as an azeotrope precipitates to the bottom of the reservoir tank or the compartments thereof. Referring to FIG. 3, each reservoir compartment has an outlet conduit, each of which drains the dewatered solvent from the top end of a compartment through the bottom end of the reservoir tank. The outlet conduits drain from the top end of each compartment in order to prevent any water that may settle to the bottom of a compartment from being drawn into an outlet conduit.

Each outlet conduit drains dewatered solvent back to one of tank 104a, 104b, 106 by way of solvent return line 120a, 120b, 120c. Each compartment of the accumulator and reservoir tank is drained periodically, preferably daily, of the water and other contaminants that have settled to the bottom.

The system of the present invention represents a significant advancement in the replacement of perchloroethylene as a dry cleaning solvent. The apparatus of the present invention makes feasible the use of glycol ethers as dry cleaning solvents in commercial applications, which, unlike perchloroethylene, do not pose a hazard to health or the environment.

The foregoing description of the preferred embodiments should be taken as illustrating, rather than as limiting, the present invention as defined by the claims. Numerous variations and combinations of the features described above can be utilized without departing from the present invention.

What is claimed is:

1. An apparatus comprising:
    a vertical accumulator tank having a top end and a bottom end, said accumulator tank being serially connected to a vertical reservoir tank having a top end and a bottom end;
    a down tube vertically positioned in said accumulator tank having a top end nearest said top end of said accumulator tank and a bottom end nearest said bottom end of said accumulator tank, with an inlet at said top end of said down tube and an outlet at said bottom end of said down tube;
    an inlet conduit connected said inlet of said down tube, said inlet conduit entering said bottom end of said accumulator tank and defining an upward flow path within said accumulator tank to said inlet at said top end of said down tube;
    a heat exchanger in communication with said down tube for withdrawing heat therefrom; and
    a transfer conduit defining a downward flow path from said top end of said accumulator tank to said bottom end of said reservoir tank.

2. The apparatus of claim 1, comprising an outlet conduit vertically positioned within said reservoir tank having a top end nearest said top end of said reservoir tank and a bottom end exiting said bottom end of said reservoir tank, with an inlet at said top end of said outlet conduit and a discharge opening at said bottom end of said outlet conduit, so that said outlet conduit defines a downward flow path exiting said bottom end of said reservoir tank from the top end thereof.

3. The apparatus of claim 2, further comprising an outlet for discharging a liquid from said bottom end of said reservoir tank.

4. The apparatus of claim 1, further comprising an outlet for discharging a liquid from said bottom end of said accumulator tank.

5. The apparatus of claim 1, wherein said heat exchanger comprises a coil comprising windings wrapped around at least a portion of said down tube, and a coolant circulating through said coil.

6. The apparatus of claim 5, wherein said portion of said down tube around which said coil windings are wrapped comprises perforations through which liquid passing through said down tube exits over said coil windings as it is discharged.

7. The apparatus of claim 5, wherein said coolant is water cooled below room temperature.

8. The apparatus of claim 5, wherein said coil comprising windings wrapped around said down tube comprises an inlet end and an outlet end, each passing through said bottom end of said accumulator tank and in communication with a refrigerator, and said coolant comprises a refrigerant.

9. The apparatus of claim 1, wherein said inlet conduit supplies to said down tube a heated mixture of two liquids that are immiscible at room temperature, and said heat exchanger is adapted to cool said mixture to a temperature below the range within which said liquids are miscible.

10. The apparatus of claim 9, wherein said mixture comprises a glycol ether and water.

11. The apparatus of claim 10, wherein said glycol ether is selected from the group consisting of propylene glycol tertiary butyl ether, propylene glycol n-butyl ether and mixtures thereof.

12. The apparatus of claim 1, wherein said accumulator tank is divided vertically into a plurality of individual compartments comprising first and second compartments, said down tube comprises a first down tube vertically positioned in said first compartment of said accumulator tank and a second down tube vertically positioned in said second compartment of said accumulator tank, said inlet conduit comprises a first inlet conduit connected to the inlet at the top end of said first down tube and a second inlet conduit connected to the inlet at the top end of said second down tube, said first and second inlet conduits entering said bottom end of said accumulator tank and defining upward flow paths within the respective first and second accumulator tank compartments to said respective top ends of said first and second down tubes; said heat exchanger comprises a first heat exchanger in communication with said first down tube and a second heat exchanger in communication with said second down tube; and said transfer conduit comprises a first transfer conduit and a second transfer conduit, both of which define a downward flow path from said first and second compartments of said accumulator tank to said bottom end of said reservoir tank.

13. The apparatus of claim 12, wherein said reservoir tank is divided vertically into a plurality of individual compartments comprising a first compartment and a second compartment; and said first transfer conduit defines a downward flow path from said first compartment of said accumulator tank to said first compartment of said reservoir tank, and said second transfer conduit defines a downward flow path from said second compartment of said accumulator tank to said second compartment of said reservoir tank.

14. The apparatus of claim 13, further comprising a first outlet conduit vertically positioned in said first compartment of said reservoir tank and a second outlet conduit vertically positioned in said second compartment of said reservoir tank, each outlet conduit having a top end nearest the top end of its respective compartment; with an outlet at the top end of each outlet conduit and a discharge opening at the bottom end of each outlet conduit, so that each outlet conduit defines a downward flow path exiting the bottom end of its respective compartment from the top end thereof.

15. The apparatus of claim 13, further comprising an outlet on the bottom end of each compartment of said reservoir tank for draining liquid therefrom.

16. The apparatus of claim 12, further comprising an outlet on the bottom end of each compartment of said accumulator tank for draining liquid therefrom.

17. The apparatus of claim 1 in combination with a dry-cleaning machine having a cleaning section, a storage tank for liquid cleaning solvent, and a glycol ether cleaning solvent in said storage tank, said combination further comprising a pump having an inlet and an outlet, said pump outlet being connected to said inlet conduit of said apparatus; a solvent inlet line connecting said solvent storage tank to said pump inlet; and a solvent return line connecting said reservoir tank of said apparatus to said solvent storage tank; wherein said pump is adapted to pump liquid cleaning solvent from said solvent storage tank through said solvent inlet line to said inlet conduit of said apparatus, so that upon exiting said apparatus from said reservoir tank, said liquid cleaning solvent returns by way of said solvent return line to said solvent storage tank; and said heat exchanger is adapted to cool said cleaning solvent to a temperature below the range within which said glycol ether is miscible with water.

18. The combination of claim 17, further comprising a filter positioned between said pump inlet and said solvent storage tank.

19. The combination of claim 17, wherein said glycol ether is selected from the group consisting of propylene glycol tertiary butyl ether, propylene glycol n-butyl ether, and mixtures thereof.

20. The combination of claim 17, wherein said apparatus further comprises an outlet at said bottom end of said accumulator tank for draining liquid therefrom.

21. The combination of claim 17, wherein said apparatus further comprises an outlet at said bottom end of said reservoir tank for draining liquid therefrom.

22. The combination of claim 17, wherein said heat exchanger comprises a coil comprising windings wrapped around at least a portion of said down tube and a coolant flowing therethrough.

23. The combination of claim 22, wherein said coolant comprises water cooled below room temperature.

24. The combination of claim 22, wherein said portion of said down tube around which said coil windings are wrapped comprises perforations through which said cleaning solvent is discharged, so that said discharged solvent passes between said windings of said coil.

25. The combination claim 22, wherein said coil wound around said down tube of said apparatus comprises an inlet end and an outlet end each passing through the bottom end of said accumulator tank and in communication with a refrigerator, and said coolant comprises a refrigerant.

26. The combination of claim 17, wherein:
said cleaning solvent storage tank is divided into a plurality of individual compartments comprising first and second compartments;
said solvent inlet line comprises first and second solvent inlet lines;
said solvent return line comprises first and second solvent return lines;
said accumulator tank of said apparatus is divided vertically into a plurality of individual compartments comprising first and second compartments;
said pump comprises a first pump having an outlet and an inlet connected to said first compartment of said solvent storage tank by way of said first solvent inlet line and a second pump having an outlet and an inlet connected to said second compartment of said solvent storage tank by way of said second solvent inlet line;
said down tube comprises a first down tube positioned vertically in said first compartment of said accumulator tank and a second down tube positioned vertically in said second compartment of said accumulator tank;
said inlet conduit comprises a first inlet conduit connected to said outlet of said first pump, said first inlet conduit entering said bottom end of said first compartment of said accumulator tank and defining an upward flow path within said first compartment and connecting to the inlet at the top end of said first down tube, and a second inlet conduit connected to said outlet of said second pump, said second inlet conduit entering said bottom end of said second compartment of said accumulator tank and defining an upward path through said second compartment and connecting to the inlet at the top end of said second down tube;
said heat exchanger comprises a first heat exchanger in communication with said first down tube and a second heat exchanger in communication with said second down tube;

said transfer conduit comprises a first transfer conduit and a second transfer conduit, both of which define a downward flow path from said first and second compartments of said accumulator tank to said bottom end of said reservoir tank; and said reservoir tank is adapted to return said cleaning solvent to said first and second compartments of said solvent storage tank by way of said first and second solvent return line;

wherein said first and second pumps are adapted to pump liquid cleaning solvent from said first and second compartments of said solvent storage through said first and second solvent inlet lines to said first and second inlet conduits of said apparatus, so that upon exiting said reservoir tank, said liquid cleaning solvent returns by way of said first and second solvent return lines to said first and second compartments of said solvent storage tanks; and said first and second heat exchangers are adapted to cool said cleaning solvent to a temperature below the range which said glycol ether is miscible with water.

27. The combination of claim 26, wherein said reservoir tank comprises an outlet conduit vertically positioned therein having a top end nearest the top end of said reservoir tank and a bottom end exiting said bottom end of said reservoir tank, with an inlet at said top end of said outlet conduit and a discharge opening at said bottom end, so that said outlet conduit defines a downward flow path exiting said bottom end of said reservoir tank from said top end thereof and returning said cleaning solvent to said first and second compartments of said solvent storage tank by way of said first and second solvent return lines.

28. The combination of claim 26, further comprising a first filter positioned between said first pump inlet and said first compartment of said solvent storage tank and a second filter positioned between said second pump inlet and said second compartment of said solvent storage tank.

29. The combination of claim 26, wherein said glycol ether is selected from the group consisting of propylene glycol tertiary butyl ether, propylene glycol n-butyl ether, and mixtures thereof.

30. The combination of claim 26, further comprising an outlet on the bottom end of each accumulator tank compartment for draining liquid therefrom.

31. The combination of claim 26, wherein said reservoir tank is divided vertically into a plurality of individual compartments comprising a first compartment and a second compartment; and said first transfer conduit defines a downward flow path from said first compartment of said accumulator tank to said first compartment of said reservoir tank and said second transfer conduit defines a downward flow path from said second compartment of said accumulator tank to said second compartment of said reservoir tank; wherein said first compartment of said reservoir tank is adapted to return said cleaning solvent to said first compartment of said solvent storage tank by way of said first solvent return line and said second compartment of said reservoir tank is adapted to return said cleaning solvent to said second compartment of said solvent storage tank by way of said second solvent return line.

32. The combination of claim 31, wherein each compartment of said reservoir tank comprises an outlet conduit vertically positioned therein having a top end nearest the top end of said reservoir tank and exiting the bottom end of its respective reservoir tank compartment, with an inlet at said top end of each outlet conduit and a discharge opening at each bottom end, so that each outlet conduit defines a downward flow path exiting the bottom end of its respective reservoir tank compartment from the top end thereof, each outlet conduit having a corresponding solvent storage tank compartment and solvent return line through which said cleaning solvent is returned to said corresponding compartment.

33. The combination of claim 31, further comprising an outlet on the bottom end of each reservoir tank compartment for draining liquid there from.

34. The combination of claim 26, wherein each heat exchanger comprises a coil comprising windings wrapped around at least a portion of each down tube with a coolant flowing therethrough.

35. The combination of claim 34, wherein said coolant comprises water cooled below room temperature.

36. The combination of claim 34, wherein each coil comprises windings wrapped around each down tube comprises an inlet end and an outlet end, each passing through the bottom end of said accumulator tank and in communication with a refrigerator, and said coolant comprises a refrigerant.

37. The combination of claim 34, wherein the portion of each down tube around which said coil windings are wrapped comprises perforations through which said cleaning solvent is discharged so that said discharged solvent passes between said windings of each coil.

* * * * *